US011929791B2

(12) United States Patent
Yamaguchi

(10) Patent No.: US 11,929,791 B2
(45) Date of Patent: Mar. 12, 2024

(54) COMMUNICATION SYSTEM

(71) Applicant: NEC Corporation, Tokyo (JP)

(72) Inventor: Shohei Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 17/259,360

(22) PCT Filed: Jul. 23, 2019

(86) PCT No.: PCT/JP2019/028760
§ 371 (c)(1),
(2) Date: Jan. 11, 2021

(87) PCT Pub. No.: WO2020/022303
PCT Pub. Date: Jan. 30, 2020

(65) Prior Publication Data
US 2022/0352925 A1 Nov. 3, 2022

(30) Foreign Application Priority Data
Jul. 24, 2018 (JP) .................................. 2018-138136

(51) Int. Cl.
*H04L 25/00* (2006.01)
*H02J 13/00* (2006.01)
(Continued)

(52) U.S. Cl.
CPC .......... *H04B 3/44* (2013.01); *H02J 13/00002* (2020.01); *H04L 12/10* (2013.01)

(58) Field of Classification Search
CPC ...... H04B 3/44; H04B 10/808; H04B 10/806; H04B 10/29; H04B 10/614; H04J 14/0212; H04J 14/0216; H04J 14/022
(Continued)

(56) References Cited

U.S. PATENT DOCUMENTS 6,157,098 A  12/2000 Kojima et al.
6,714,394 B1  3/2004 Kumayasu et al.
(Continued)

FOREIGN PATENT DOCUMENTS

CN  103975534 A  8/2014
CN  105474552 A  4/2016
(Continued)

OTHER PUBLICATIONS

Extended European Search Report for EP Application No. EP19841333.8 dated Jul. 9, 2021.
(Continued)

*Primary Examiner* — Khai Tran
(74) *Attorney, Agent, or Firm* — Sughrue Mion, PLLC

(57) ABSTRACT

To be able to check, from a remote location, a switching result of a power supply route, this communication system comprises: a plurality of terminal stations which each have a function of supplying power to a power supply path; a branching device which switches the power supply route, which includes a power supply path; and a monitoring device which, in response to one of the plurality of terminal stations transmitting to the branching device a switching signal specifying the power supply route, compares the voltages of the power supplied to the power supply paths respectively observed by the plurality of terminal stations, before and after transmission of the switching signal, and which, with the compared power supply voltages each having fluctuated by a first threshold or more, determines a switching result of the power supply route in the branching device.

17 Claims, 11 Drawing Sheets

(51) Int. Cl.
*H04B 3/44* (2006.01)
*H04L 12/10* (2006.01)

(58) Field of Classification Search
USPC .......................................................... 375/257
See application file for complete search history.

(56) References Cited

U.S. PATENT DOCUMENTS

| | | | |
|---|---|---|---|
| 2007/0138417 A1* | 6/2007 | Sugiyama | H04B 10/032 250/551 |
| 2014/0103739 A1 | 4/2014 | Takigawa | |
| 2014/0117775 A1* | 5/2014 | Agata | H01H 9/00 307/113 |
| 2016/0203930 A1 | 7/2016 | Aida | |
| 2017/0331516 A1 | 11/2017 | Yamaguchi | |
| 2018/0054271 A1* | 2/2018 | Abe | H04J 14/0219 |
| 2019/0044621 A1* | 2/2019 | Takigawa | H02H 9/02 |
| 2020/0412476 A1* | 12/2020 | Aida | H04J 14/0221 |

FOREIGN PATENT DOCUMENTS

| | | |
|---|---|---|
| EP | 2765712 A1 | 8/2014 |
| JP | H11-186959 A | 7/1999 |
| JP | 2002-057607 A | 2/2002 |
| WO | 2013/002391 A1 | 1/2013 |
| WO | 2015/025518 A1 | 2/2015 |
| WO | 2016/092806 A1 | 6/2016 |
| WO | 2017/141855 A1 | 8/2017 |

OTHER PUBLICATIONS

Chinese Office Action for CN Application No. 201980046102.8 dated Nov. 2, 2021 with English Translation.
International Search Report for PCT Application No. PCT/JP2019/028760, dated Sep. 24, 2019.
English translation of Written opinion for PCT Application No. PCT/JP2019/028760, dated Sep. 24, 2019.

* cited by examiner

COMMUNICATION SYSTEM

This application is a National Stage Entry of PCT/JP2019/028760 filed on Jul. 23, 2019, which claims priority from Japanese Patent Application 2018-138136 filed on Jul. 24, 2018, the contents of all of which are incorporated herein by reference, in their entirety.

TECHNICAL FIELD

The present invention relates to a communication system and a monitoring method, and particularly, relates to a communication system including a branching unit being capable of switching a power feeding route by an instruction of a terminal station, and a monitoring method.

BACKGROUND ART

In a general undersea cable system, a branching unit (BU) is placed undersea. Power feeding equipment (PFE) grounded on a terminal station on land feeds direct current to the BU via a power feeding path. A plurality of power feeding paths are connected to the BU, and the BU has a function of switching a power feeding route. The BU switches therein a connection state of the power feeding path by use of a switch included in the BU, in response to a control signal from the terminal station placed on land. Therefore, the BU is capable of switching the power feeding route in such a way as to be fed with power by another terminal station or another power feeding path. Hereinafter, an individual power feeding line between a terminal station and a BU is referred to as a power feeding path, and a route of total fed current to a BU constituted of one or more pieces of power feeding equipment and one or more power feeding paths is referred to as a power feeding route. PTL 1 describes an undersea cable system that maintains power feeding to a BU by switching a power feeding route when a failure occurs in a power feeding path.

CITATION LIST

Patent Literature

[PTL 1] International Publication No. WO2015/025518

SUMMARY OF INVENTION

Technical Problem

A general BU does not have a function (response function) of notifying a terminal station on land of a switching result of a power feeding route. Thus, when a command is transmitted to a BU from a terminal station in order to switch a power feeding route, the terminal station cannot be automatically informed of a switching result of the power feeding route. In order to confirm, in the terminal station, the switching result of the power feeding route of the BU that does not include the response function, it is necessary to confirm, for example, a log of transmission of a switching signal to the BU being recorded in the terminal station. However, for example, even when the BU cannot receive the switching signal, and, as a result, switching of the power feeding route is not performed, the transmission log of the terminal station indicates that the switching is completed. Thus, there is a concern that the switching result of the power feeding route in the BU may not be confirmed correctly only by referring to the transmission log of the terminal station.

In such a case, an operator needs to confirm whether a power feeding route is switched normally, by operating power feeding equipment (PFE) in each of a plurality of terminal stations. However, there is a problem that, since such an operation needs to be performed by an operator, time is required until a confirmation result is acquired, and operation of power feeding equipment including a high-voltage circuit is needed.

Object of Invention

An object of the present invention is to provide a communication system that enables a switching result of a power feeding route to be confirmed from a remote location.

Solution to Problem

A communication system according to the present invention includes: a plurality of terminal stations each having a function of feeding power to a power feeding path; a branching unit that performs switching of a power feeding route including the power feeding path; and a monitoring device that compares, in response to any of the plurality of terminal stations transmitting, to the branching unit, a switching signal specifying a power feeding route, a power feeding voltage to the power feeding path being observed by each of the plurality of terminal stations, before and after transmission of the switching signal, and determines, with a fact that the compared power feeding voltage fluctuates by a first threshold value or more, a switching result of the power feeding route in the branching unit.

A monitoring device according to the present invention is a monitoring device used in a communication system in which a plurality of terminal stations each having a function of feeding power to a power feeding path are connected to a branching unit that performs switching of a power feeding route including the power feeding path, the monitoring device being connected to the plurality of terminal stations via a communication line, comparing, in response to any of the plurality of terminal stations transmitting, to the branching unit, a switching signal specifying a power feeding route, a power feeding voltage to the power feeding path being observed by each of the plurality of terminal stations, before and after transmission of the switching signal, and determining, with a fact that the compared power feeding voltage fluctuates by a first threshold value or more, a switching result of the power feeding route in the branching unit.

A monitoring method according to the present invention is a monitoring method for a communication system in which a plurality of terminal stations each having a function of feeding power to a power feeding path are connected to a branching unit that performs switching of a power feeding route including the power feeding path, the monitoring method including: comparing, in response to any of the plurality of terminal stations transmitting, to the branching unit, a switching signal specifying a power feeding route, a power feeding voltage to the power feeding path being observed by each of the plurality of terminal stations, before and after transmission of the switching signal; and determining, with a fact that the compared power feeding voltage fluctuates by a first threshold value or more, a switching result of the power feeding route in the branching unit.

Advantageous Effects of Invention

A communication system, a monitoring device, and a monitoring method according to the present invention enable a switching result of a power feeding route to be confirmed from a remote location.

EXAMPLE EMBODIMENT

First Example Embodiment

Figure 1:
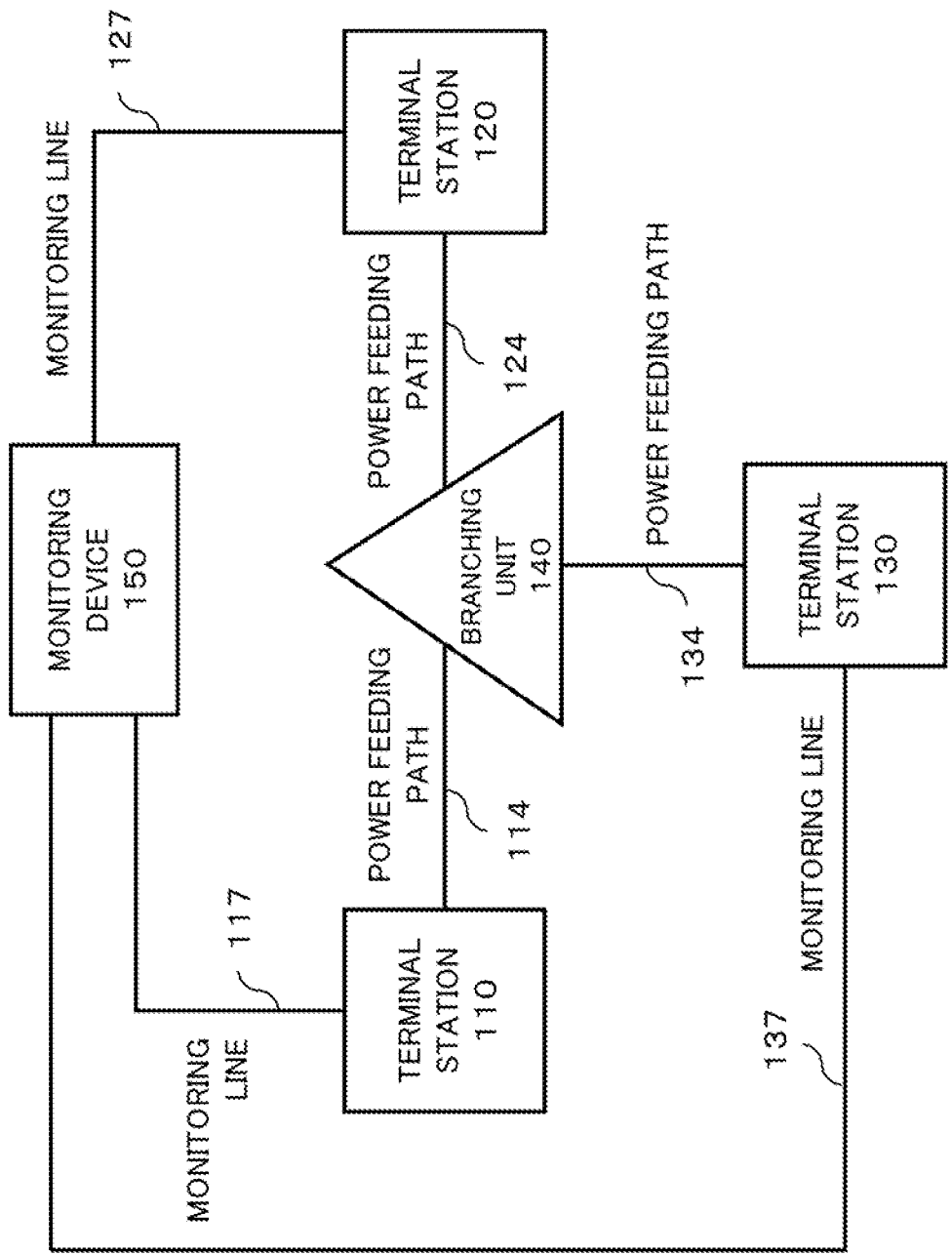
FIG. 1 is a block diagram illustrating a configuration example of an undersea cable system 100 according to a first example embodiment.

FIG. 1 is a block diagram illustrating a configuration example of an undersea cable system 100 according to a first example embodiment of the present invention. The undersea cable system 100 includes terminal stations 110, 120, and 130, a branching unit (BU) 140, and a monitoring device 150. Each of the terminal stations 110, 120, and 130 is a device having a function of feeding power to the BU 140, and being placed on land. Hereinafter, the terminal stations 110, 120, and 130 may be described as "each terminal station" when being generically referred to. Each terminal station includes, in addition to the function of feeding power to the BU 140, a function of transmitting and receiving an optical signal between the BU 140 and another terminal station via a non-illustrated optical transmission path attached to power feeding paths 114, 124, 134 and the BU 140, and a monitoring control function for the BU 140. Since a transmission and reception function of an optical signal in such a communication system as the undersea cable system 100 is known, the power feeding paths 114, 124, and 134 and a power feeding route configured by including the power feeding paths 114, 124, and 134 are mainly described in the following example embodiments. The power feeding path refers to an individual power feeding line between each terminal station and the BU 140, and the power feeding route refers to a total route of a power feeding current. In power feeding to the BU 140, for example, a power feeding route of the terminal station 110—the power feeding path 114—the BU 140—the power feeding path 124—the terminal station 120 can be configured.

The BU 140 is an undersea branching unit placed undersea, and is fed with power by a power feeding path connected to each terminal station. The BU 140 includes a switching function of switching connections of the power feeding paths 114, 124, and 134, a monitoring control function inside the BU 140, a switching function for transferring an optical signal transmitted between the terminal stations and switching an optical transmission path, and the like. The functions of the BU 140 can be controlled by the monitoring device 150 and at least one of the terminal stations. Fed electric power is used in order to achieve the functions.

The monitoring device 150 acquires, through monitoring lines 117, 127, and 137, a voltage (hereinafter, referred to as a "power feeding voltage") of a power feeding path observed in each terminal station. The monitoring device 150 also includes a function of controlling each terminal station and the BU 140. The monitoring device 150 is, for example, a server including a control unit that controls each terminal station and the BU 140, and an interface with the monitoring lines 117, 127, and 137. The monitoring device 150 includes a calculation device and a fixed storage device, and may cause the calculation device to execute a program stored in the storage device and thereby achieve the function of the program. A wired or wireless data line may be used as each of the monitoring line 117, 127, and 137. In the undersea cable system 100, the monitoring device 150 compares the power feeding voltage to a power feeding path observed by each terminal, in response to transmission of a signal for switching the power feeding paths 114, 124, and 134 from at least one terminal station to the BU 140.

When switching of a power feeding route is needed due to a failure of an undersea cable or the like, at least one terminal station 110, 120, or 130 transmits, to the BU 140, a switching signal of a power feeding route. The switching signal includes information specifying a new power feeding route after the switching. The switching signal may be transmitted to the BU 140 as an optical signal by use of the optical transmission path attached to power feeding paths 114, 124, and 134. A terminal station transmitting the switching signal notifies the monitoring device 150 that the switching signal is transmitted. When receiving the switching signal, the BU 140 reduces an influence on the undersea cable system 100 due to a failure, by switching the power feeding route as specified by the switching signal. Switching of the power feeding route can be performed by switching, with a switch (relay), a connection state between the power feeding paths 114, 124, and 134 connected to the BU 140.

For example, it is assumed that an initial power feeding route to the BU 140 is a route of the terminal station 110—the power feeding path 114—the BU 140—the power feeding path 124—the terminal station 120. The power feeding path 134 is not connected to the initial power feeding route. In this case, when a failure occurs in the power feeding path 124, the power feeding path 124 is cut off from the initial power feeding route by a switching signal, and a new power feeding route becomes a route of the terminal station 110—the power feeding path 114—the BU 140—the power feeding path 134—the terminal station 130.

When any of the terminal stations 110, 120, and 130 transmits a switching signal of the power feeding route to the BU 140, each terminal station measures power feeding voltages before and after transmission of the switching signal, and notifies the monitoring device 150. The monitoring device 150 may include a function of setting, for each terminal station, timing at which each terminal station acquires the power feeding voltage of each of the power feeding paths 114, 124, and 134. For example, when the monitoring device 150 acquires the power feeding voltage of each terminal station at predetermined timing, each terminal station may notify the monitoring device 150 that the switching signal is transmitted, and the monitoring device 150 may target, for comparison, the power feeding voltages acquired from each terminal station before and after receiving the notification. The power feeding voltage may be measured or compared in only a terminal station included in a new power feeding route after switching.

When the power feeding route is switched, a load of power feeding changes in terminal stations (the terminal stations 110 and 130 in the example described above) constituting a new power feeding route. As a result, when the BU 140 is fed with a constant current, the power feeding voltages of the terminal stations at both ends of the new power feeding route change. For example, a power feeding voltage rises in a terminal station in which a load is increased by switching of a power feeding route. Alternatively, a power feeding voltage falls in a terminal station in which a load is decreased by switching of a power feeding route. Therefore, the monitoring device 150 can determine, based on a result of a comparison of the power feeding voltages, whether the power feeding route is switched. In order to acquire a power feeding voltage of each terminal station observed immediately before a switching signal is transmitted, the monitoring device 150 may acquire the power feeding voltage of each terminal station at a certain period, and store a value of the power feeding voltage. Alternatively, when transmitting a switching signal to the BU 140, each terminal station may notify the monitoring device 150 of the power feeding voltage immediately before the transmission.

Figure 2:
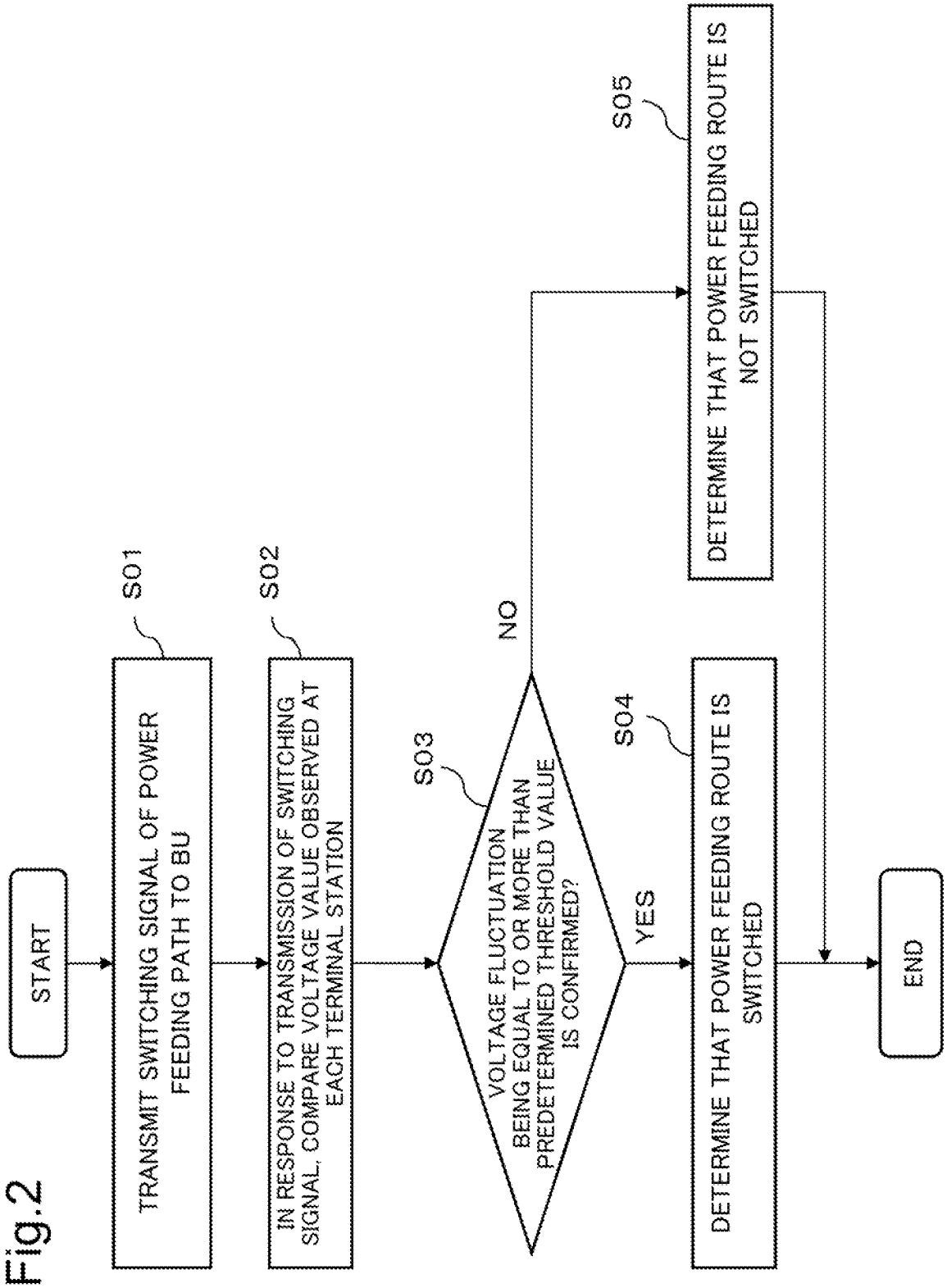
FIG. 2 is a flowchart illustrating an example of a confirmation procedure of a switching result of a power feeding route according to the first example embodiment.

FIG. 2 is a flowchart illustrating an example of a confirmation procedure of a switching result of a power feeding route according to the first example embodiment. When an event to be a trigger for switching a power feeding route occurs in any of the power feeding paths 114, 124, and 134, any of the terminal stations 110, 120, and 130 transmits a switching signal of the power feeding route to the BU 140 (step S01 in FIG. 2). Which of the terminal stations 110, 120, and 130 transmits the switching signal differs depending on an event.

In response to the transmission of the switching signal to the BU 140, the monitoring device 150 acquires, from each terminal station, power feeding voltages before and after transmission of the switching signal, and compares the power feeding voltages (S02). As a result of the comparison, when a voltage fluctuation being equal to or more than a predetermined threshold value is confirmed in each of the terminal stations constituting a new power feeding route specified by the switching signal (S03: YES), the monitoring device 150 determines that the power feeding route is switched (S04). When a voltage fluctuation being equal to or more than the predetermined threshold value is not confirmed in at least one of the terminal stations constituting the new power feeding route (S03: NO), the monitoring device 150 determines that the power feeding route is not switched (S05). In step S05, the monitoring device 150 may transmit, to some or all of the terminal stations 110, 120, and 130, an alarm signal indicating that the switching is abnormal. In step 505, the monitoring device 150 and each terminal station may each output, to outside thereof, an alarm being perceivable by an operator. In this case, an alarm to be output is, for example, an alarm display to a screen, lighting of an alarm lamp, or generation of a sound.

In step S01, the event to be a trigger for switching the power feeding route is, for example, a failure of the undersea cable system 100. In other words, a switching signal may be transmitted to the BU 140 from any of the terminal stations depending on failure occurrence in the undersea cable system 100. In this case, a terminal station detecting failure occurrence may transmit the switching signal to the BU 140. Alternatively, a terminal station detecting failure occurrence may notify the monitoring device 150 of the failure occurrence, and, based on an instruction to the terminal station 110, 120, or 130 by the monitoring device 150 receiving the notification, a terminal station receiving the instruction may transmit the switching signal to the BU 140.

Furthermore, the monitoring device 150 may regularly or irregularly acquire a power feeding voltage of each terminal station with a certain frequency, and detect failure occurrence in response to confirmation of a fluctuation of the power feeding voltage when a switching signal is not transmitted to the BU 140. After failure occurrence is detected, the monitoring device 150 may cause each terminal station to transmit the switching signal of a power feeding route.

As described above, the undersea cable system 100 according to the present example embodiment enables a switching result of a power feeding route to be confirmed in the monitoring device 150 at a remote location.

Second Example Embodiment

Figure 3:
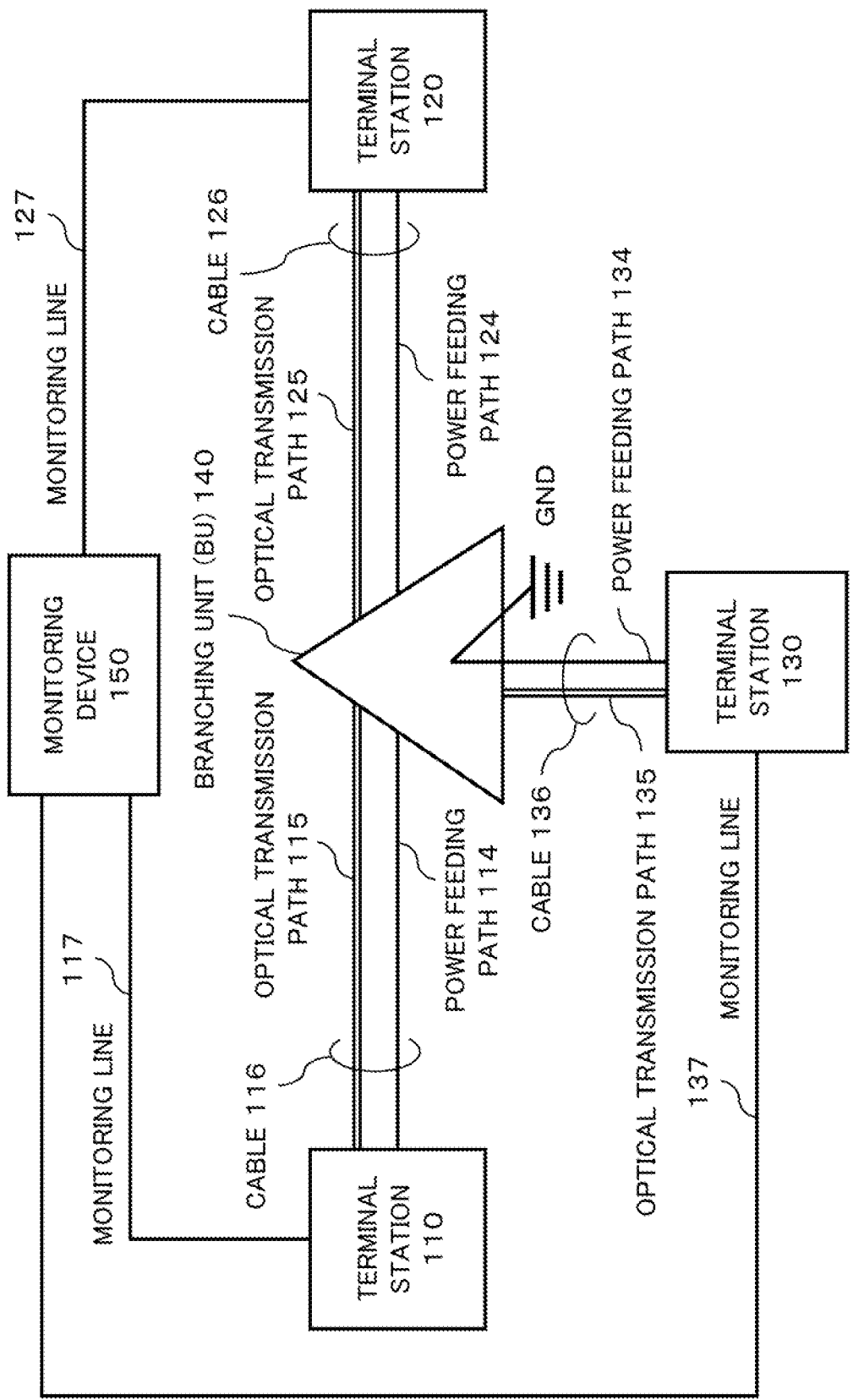
FIG. 3 is a diagram illustrating a configuration example of an undersea cable system 100 according to a second example embodiment.

An example embodiment of the present invention is described in further detail. FIG. 3 is a diagram illustrating a further detailed configuration example of an undersea cable system 100 according to a second example embodiment. As compared with FIG. 1, cables 116, 126, and 136 and optical transmission paths 115, 125, and 125 are described in FIG. 3. The cables 116, 126, and 136 are undersea communication cables including power feeding paths 114, 124, and 134 and the optical transmission paths 115, 125, and 135, respectively. The optical transmission paths 115, 125, and 135 are optical fiber transmission paths. Each terminal station and a BU 140 transmit therebetween an optical signal via the optical transmission paths 115, 125, and 135. The optical transmission paths 115, 125, and 135 may each include an optical repeater or another branching unit. In FIG. 3, an initial power feeding route is a route of a terminal station 110—the power feeding path 114—the BU 140—the power feeding path 124-*a* terminal station 120. In FIG. 3, the power feeding path 134 is grounded in the BU 140 (i.e., connected to a sea earth), and is not included in the initial power feeding route.

Figure 4:
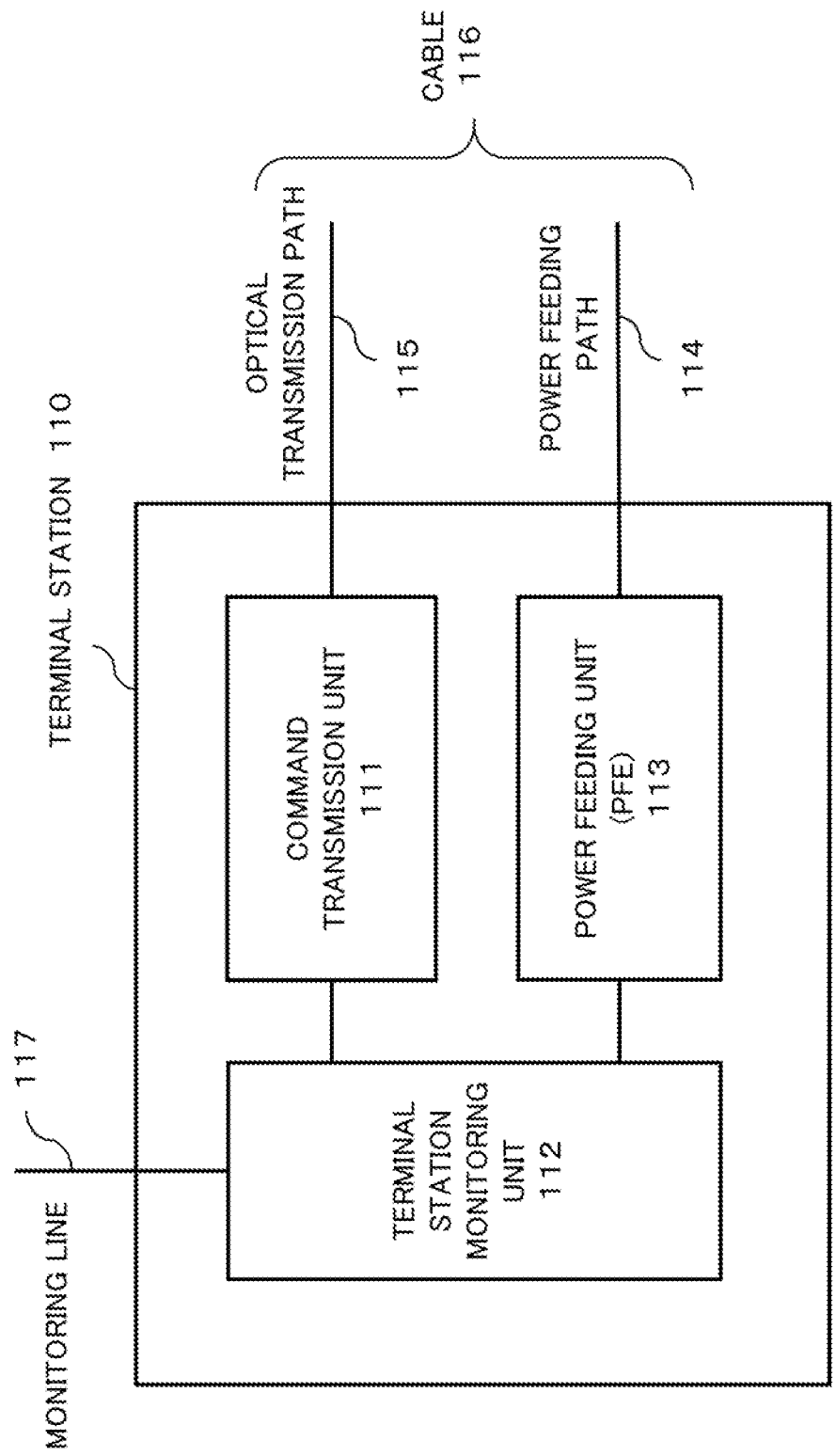
FIG. 4 is a block diagram illustrating a configuration example of a terminal station 110.

FIG. 4 is a block diagram illustrating a configuration example of the terminal station 110. The terminal stations 120 and 130 also each include a similar configuration. The terminal station 110 includes a command transmission unit 111, a terminal station monitoring unit 112, and a power feeding unit 113. In FIG. 4, description of a transmission/reception function unit for a main signal (data signal) to be transmitted between terminal stations is omitted. The command transmission unit 111 is an interface circuit that transmits, to the BU 140, a command notified of from the terminal station monitoring unit 112. For example, the terminal station monitoring unit 112 transmits a switching signal of a power feeding route to the BU 140 via the command transmission unit 111. The switching signal is transmitted to the BU 140 as an optical signal through the optical transmission path 115 included in the cable 116. An optical signal being allocated to the terminal station 110 for monitoring control and having a wavelength differing from that of the main signal may be used for transmission of a command. However, a transmission method of the command from the terminal station 110 to the BU 140 is not limited. The command may be superimposed on a power feeding current of the power feeding unit 113 and transmitted to the BU 140 via the power feeding path 114.

The power feeding unit 113 is a power source (PFE) that feeds electric energy to the BU 140. An output voltage (i.e., a power feeding voltage) and an output current of the power feeding unit 113 are capable of being monitored and set by an operation of the terminal station 110, and capable of being monitored and set by a monitoring device 150 to be connected through a monitoring line 117 as well. The power feeding unit 113 is a constant-current power source.

The terminal station monitoring unit 112 is an interface circuit with the command transmission unit 111, the power feeding unit 113, and the monitoring device 150. The terminal station monitoring unit 112 notifies the monitoring device 150 of information of the command transmission unit 111 and the power feeding unit 113 via the monitoring line 117. The terminal station monitoring unit 112 notifies the command transmission unit 111 and the power feeding unit 113 of a command transmitted by the monitoring device 150 and a command input to the terminal station 110 by an operator, depending on a content of the commands.

Referring to FIG. 3, when sensing an abnormality of each of the cables 116, 126, and 136, each of the terminal stations 110, 120, and 130 notifies the monitoring device 150 that there is a failure in the cable. The monitoring device 150 instructs the BU 140 to switch a power feeding route, based on information about the failure notified of from each of the terminal stations 110, 120, and 130. For example, each terminal station senses a failure of each of the cables 116, 126, and 136 by detecting an abnormality of an optical signal to be transmitted through each cable. When an abnormality occurs in a power feeding voltage to a power feeding path, each terminal station may determine that there is an abnormality in a power feeding route including the power feeding path. The monitoring device 150 may identify the power feeding path in which a failure occurs, based on communication status between terminal stations and a fluctuation amount of a power feeding voltage.

Figure 5:
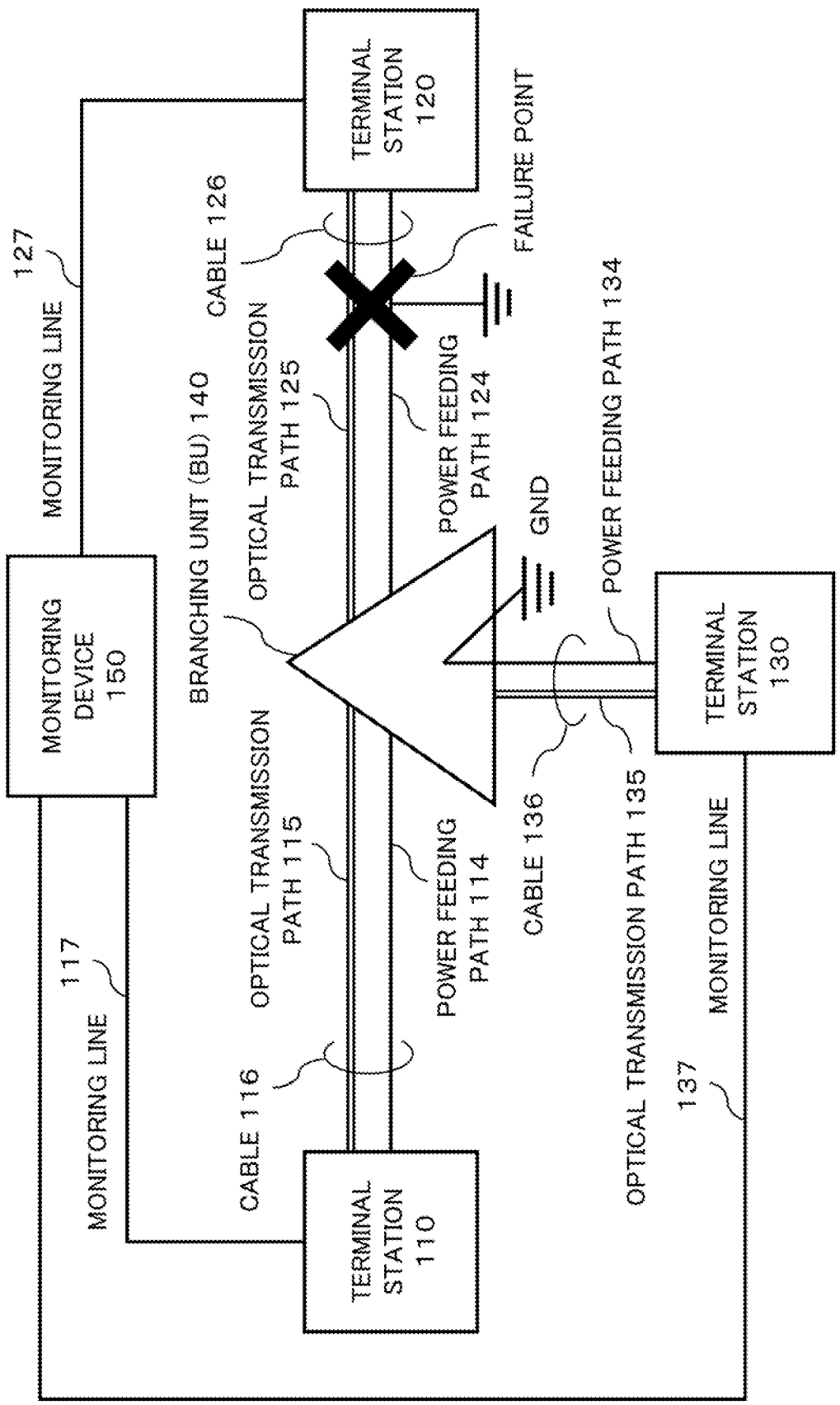
FIG. 5 is a diagram illustrating a switching example of a power feeding route.
Figure 6:
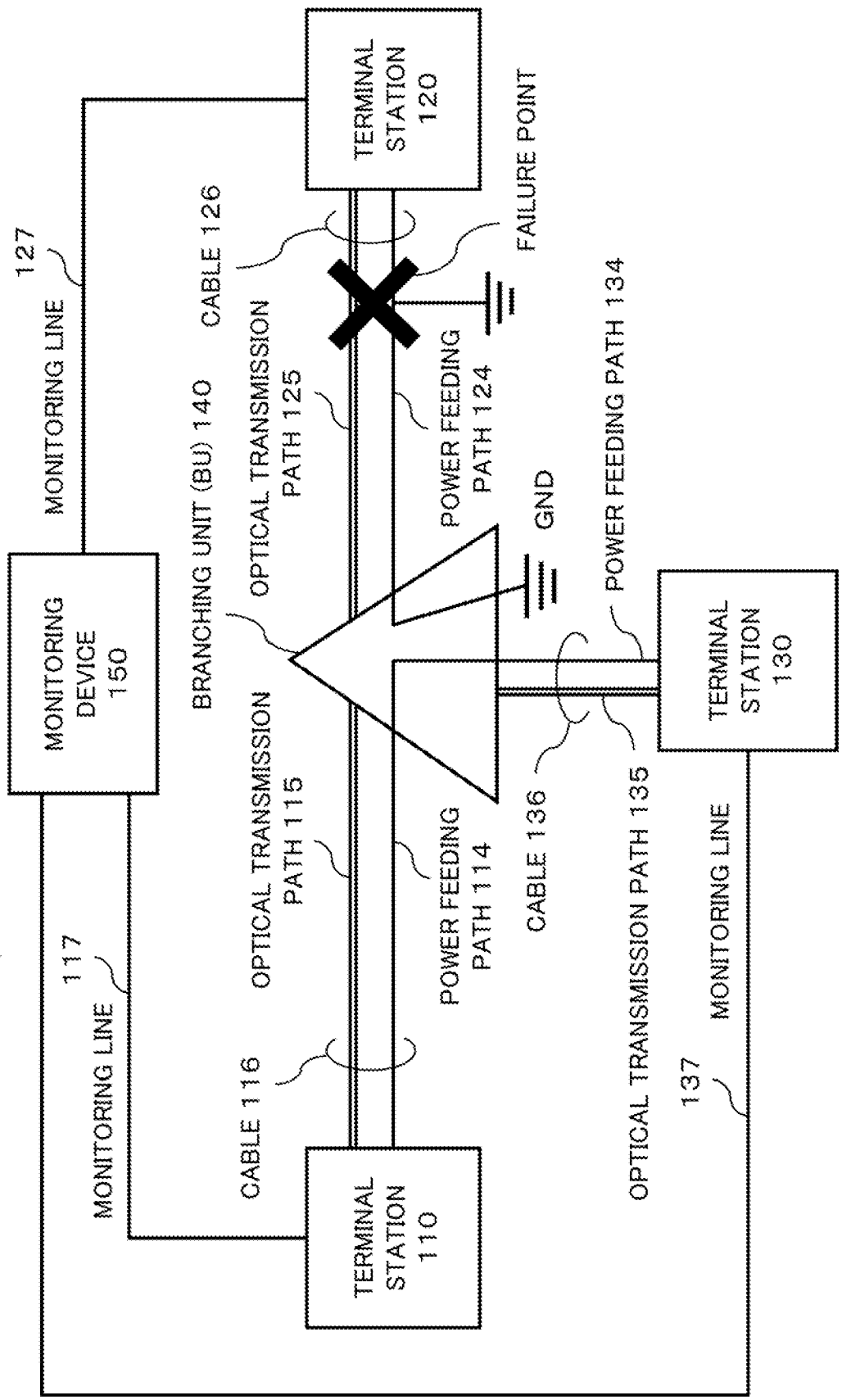
FIG. 6 is a diagram illustrating a switching example of the power feeding route.

FIGS. 5 and 6 are diagrams illustrating a switching example of a power feeding route of the undersea cable system 100. FIG. 5 illustrates an example of a state immediately after a grounding failure of the power feeding path 124 occurs at a failure point of the cable 126 between the terminal station 120 and the BU 140. In FIG. 5, the BU 140 side and the terminal station 120 side of the power feeding path 124 are each grounded due to the failure at the failure point, and the optical transmission path 125 is disconnected. Since a communication between the terminal station 120 and the BU 140 is abnormal, the terminal station 120 notifies the monitoring device 150 of the failure of the cable 126. Immediately after the failure occurrence, an initial power feeding route coupling the terminal station 110 to the terminal station 120 is not switched.

The monitoring device 150 senses occurrence of a failure in a power feeding route from information about the failure notified of from each terminal station. In a case of FIG. 5, since the monitoring device 150 is notified of an abnormality of the cable 126 from the terminal station 120, the monitoring device 150 determines that a power feeding route needs to be switched in such a way that the power feeding path 124 is not used. The monitoring device 150 instructs the terminal station 110 or 130 to switch the power feeding route of the BU 140. The terminal station 110 or 130 receiving the instruction transmits a switching signal to the BU 140. In this case, the switching signal includes an instruction to ground the power feeding path 124 in the BU 140, and connect the power feeding path 114 and the power feeding path 134.

FIG. 6 illustrates, as an example, a state after the initial power feeding route is switched to a new power feeding route by transmitting a switching signal from the terminal station 110 to the BU 140. The BU 140 receiving the switching signal from the terminal station 110 grounds the power feeding path 124, and connects the power feeding path 114 with the power feeding path 134. Switching of the power feeding route in the BU 140 may be executed by a general switching circuit including a relay. Accordingly, a new power feeding route becomes a route of the terminal station 110—the power feeding path 114—the BU 140—the power feeding path 134—the terminal station 130. In this way, power feeding is continued between the terminal station 110 and the terminal station 130 via the BU 140 by the new power feeding route.

Figure 7:
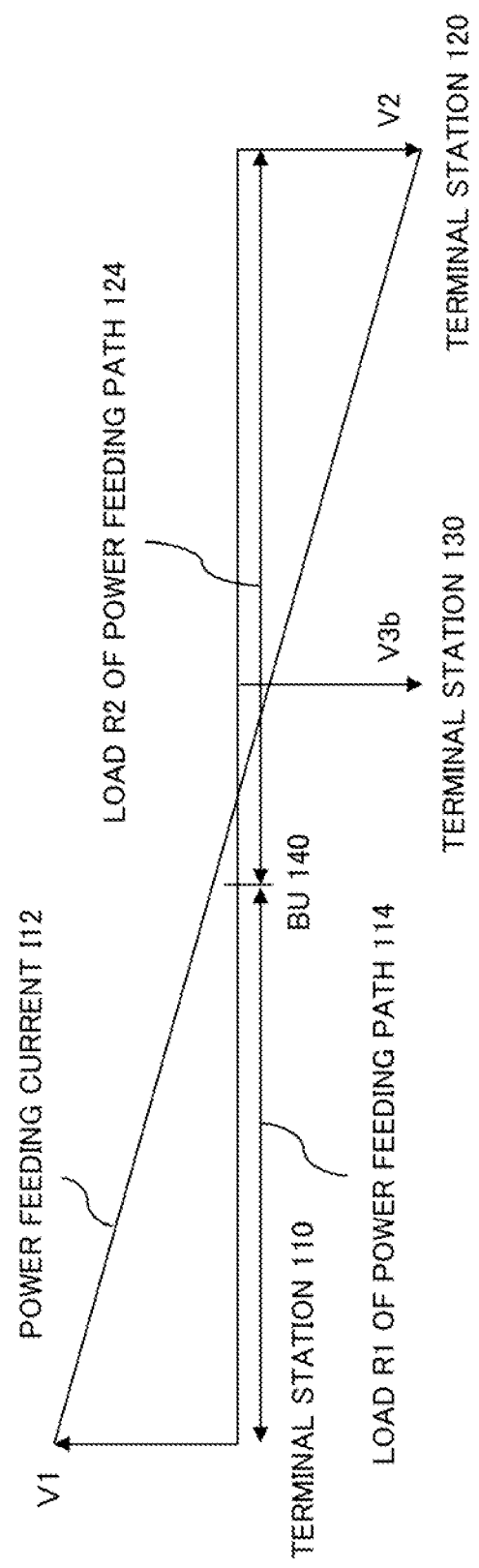
FIG. 7 is a diagram exemplifying a power feeding voltage and a power feeding current between the terminal station 110 and a terminal station 120.
Figure 8:
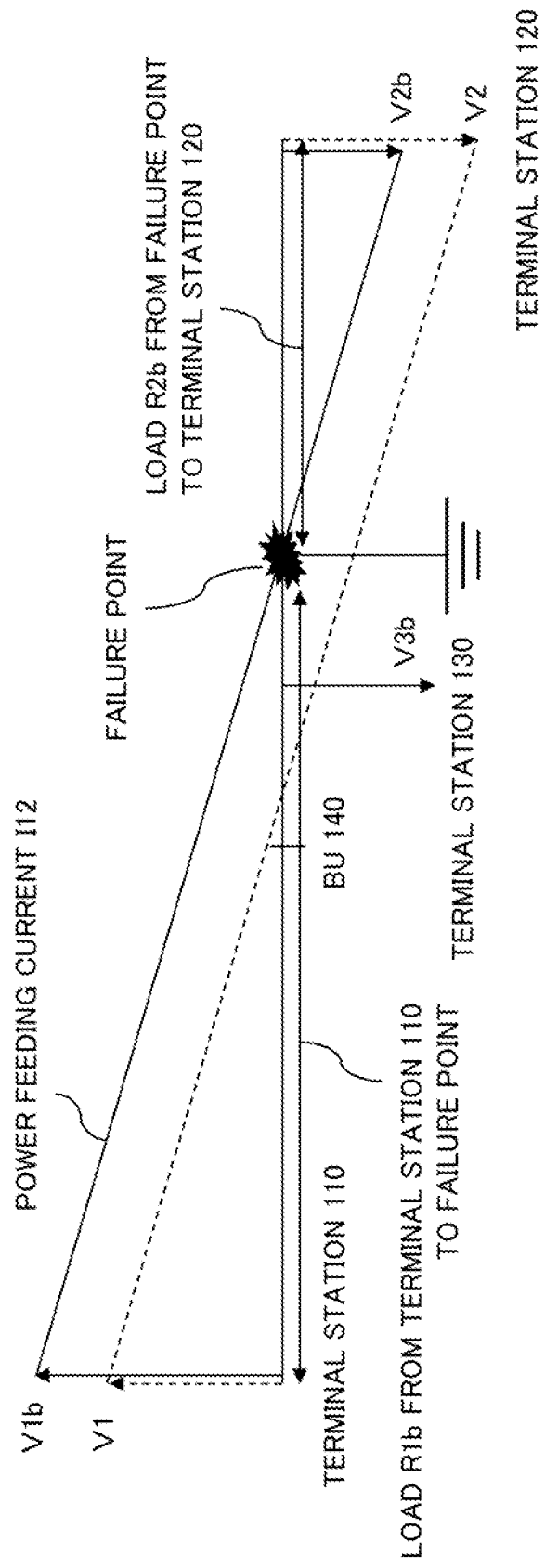
FIG. 8 is a diagram exemplifying a power feeding voltage and a power feeding current between the terminal station 110 and the terminal station 120.
Figure 9:
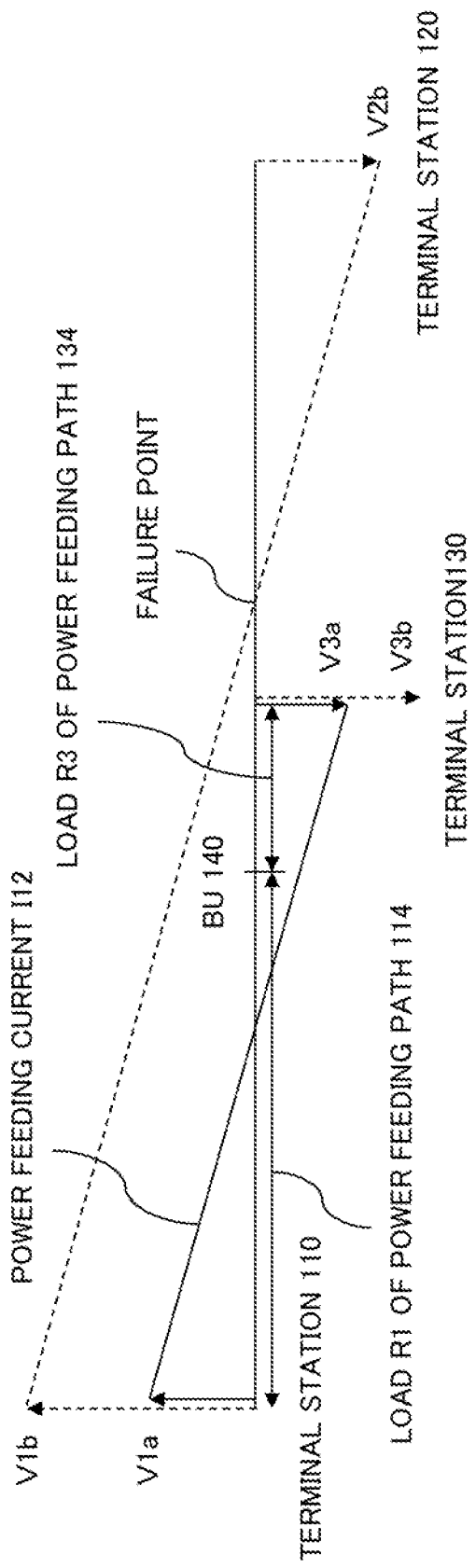
FIG. 9 is a diagram exemplifying a power feeding voltage and a power feeding current between the terminal station 110 and a terminal station 130.

Detection of a switching result of a power feeding route is described by use of FIGS. 7 to 9. FIG. 7 is a diagram exemplifying a power feeding voltage and a power feeding current between the terminal station 110 and the terminal station 120 before a failure of the cable 126 occurs. A horizontal direction in each of FIGS. 7 to 9 indicates magnitude of a load of power feeding, and a vertical direction indicates a power feeding voltage. The BU 140, a non-illustrated repeater, another BU, and the like may exist between the terminal station 110 and the terminal station 120. Thus, length of a horizontal axis (i.e., magnitude of a load) is not necessarily associated with a distance of a power feeding path. It is assumed that, in FIGS. 7 to 9, a load of the BU 140 is negligible as compared with a load of a total initial power feeding route, or included in a load of any of the power feeding paths.

A power feeding state in FIG. 7 is associated with the configuration diagram of FIG. 3. It is assumed that, in FIG. 7, a load of the power feeding path 114 is R1, and a load of the power feeding path 124 is R2. It is assumed that a power feeding unit of the terminal station 110 has a positive voltage and a power feeding voltage being V1 (V1>0), and a power feeding unit of the terminal station 120 has a negative voltage and a power feeding voltage being V2 (V2<0). In this case, a power feeding current I12 of an initial power feeding route (the terminal station 110—the power feeding path 114—the BU 140—the power feeding path 124—the terminal station 120) is represented by an inclination of an oblique line in FIG. 7, i.e., (V2−V1)/(R1+R2). Power feeding by the constant current I12 is performed by controlling V1 and V2. A power feeding unit of the terminal station 130 has a negative voltage and a power feeding voltage being V3b (V3b<0). As illustrated in FIG. 3, the power feeding path 134 is connected to the BU 140, but the power feeding path 134 is grounded in the BU 140.

FIG. 8 is a diagram exemplifying a power feeding voltage and a power feeding current between the terminal station 110 and the terminal station 120 immediately after the failure of the cable 126 occurs. A power feeding state in FIG. 8 is associated with the configuration diagram of FIG. 5. At this moment, a switching signal is not transmitted to the BU 140 yet. The power feeding path 124 is forcibly grounded at a failure point due to the failure, and, as a result, the power feeding voltages of the terminal station 110 and the terminal station 120 change in order to maintain, at I12, a power feeding current indicated by an inclination of an oblique line in FIG. 8. In FIG. 8, a load from the terminal station 110 to the failure point is R1b, and a load from the failure point to the terminal station 120 is R2b. At a moment before the terminal station 110 transmits a switching signal after failure occurrence, the power feeding voltage of the terminal station 110 is V1b (V1b>0), and the power feeding voltage of the terminal station 120 is V2b (V2b<0). Since the failure point is grounded, a voltage of a power feeding path at the failure point is zero. Since the terminal stations 110 and 120 are constant current sources, a current flowing from the terminal station 110 to the failure point and a current flowing from the failure point to the terminal station 120 are each I12. In other words, immediately after occurrence of the failure, V1b and V2b are controlled in such a way that I12=−V1b/R1b=V2b/R2b is satisfied. As illustrated in FIG. 5, the power feeding path 134 of the terminal station 130 is grounded in the BU 140. At this moment, the power feeding path 134 is not included in a power feeding route yet.

When instructing the terminal station 110 to transmit a switching signal, the monitoring device 150 may specify transmission timing (e.g., time) of the switching signal, and notify the terminal station 110 and the terminal station 130 of the timing. Thus, the terminal station 130 can also measure power feeding voltages before and after the transmission timing of the switching signal by the terminal station 110, and notify the monitoring device 150 of a measurement result.

FIG. 9 is a diagram exemplifying a power feeding voltage and a power feeding current between the terminal station 110 and the terminal station 130 after a switching signal is transmitted to the BU 140, and the initial power feeding route is switched to a new power feeding route. A power feeding state in FIG. 9 is associated with the configuration diagram of FIG. 6. In the BU 140, the power feeding path 114 and the power feeding path 134 are connected, and, as a result, the power feeding current I12 flows through the terminal station 110—the power feeding path 114—the BU 140—the power feeding path 134—the terminal station 130 being the new power feeding route. Because of power feeding by a constant current, the power feeding current I12 does not change from FIG. 8 even in FIG. 9, and therefore, the power feeding voltages of the terminal station 110 and the terminal station 130 change in order to maintain, at I12, a power feeding current indicated by an inclination of an oblique line (solid line). The present example embodiment illustrates that the power feeding voltage of the terminal station 110 changes from V1b to V1a, and the power feeding voltage of the terminal station 130 changes from V3b to V3a. In other words, in FIG. 9, I12=(V3a−V1a)/(R1+R3). In a state of FIG. 9, the power feeding path 124 is grounded in the BU 140. As a result, power is no longer fed to the failure point from any of the BU 140 and the terminal station 120 by stopping power feeding to the power feeding path 124 from the terminal station 120, and safe repair of the failure point becomes possible.

When a new power feeding route is configured as a result of normal processing of the switching signal in the BU 140, a load of a power feeding route at each terminal station generally changes. Thus, the power feeding voltages of the terminal station 110 and the terminal station 130 further change from the state of FIG. 8 as described above in order to maintain a power feeding current at I12. The terminal station 110 and the terminal station 130 measure such changes (V1b→V1a and V3b→V3a) of the power feeding voltages, and notify the monitoring device 150. When these voltage changes are equal to or more than a predetermined threshold value, the monitoring device 150 determines that switching of a power feeding route is performed. Herein, the monitoring device 150 determines whether Equation (1) and Equation (2) below are satisfied, with Vth1 and Vth3 each being a predetermined voltage fluctuation amount. Vth1 and Vth3 are threshold values for determining whether a fluctuation of a power feeding voltage is attributed to a fluctuation of a load resulting from switching of a power feeding route. When Vth1 and Vth3 are each smaller, it can be determined that a fluctuation with a smaller load is switching of a power feeding route.

$$\Delta V1 = |V1a - V1b| \geq Vth1 \tag{1}$$

$$\Delta V3 = |V3a - V3b| \geq Vth3 \tag{2}$$

When Equation (1) and Equation (2) are satisfied, it can be estimated that a load of a power feeding route is changed by switching to a new power feeding route, and therefore, the monitoring device 150 determines that switching of the power feeding route is performed normally by transmission of a switching signal. On the other hand, when at least one of Equation (1) and Equation (2) is not satisfied, there is a possibility that a new power feeding route is not configured, and therefore, it may be determined that switching of the power feeding route in the BU 140 is not performed normally. For example, when the power feeding path 114 remains grounded at the failure point due to unsuccessful switching of the power feeding route, V1a=V1b, and therefore, Equation (1) is not satisfied. Alternatively, when the power feeding path 134 remains grounded in the BU 140 due to unsuccessful switching of the power feeding route, V3a=V3b, and therefore, Equation (2) is not satisfied.

Depending on a distance and a configuration of a power feeding route, a difference between a load of an initial power feeding route and a load of a new power feeding route in a terminal station constituting the new power feeding route may be small. In such a case, a fluctuation of a power feeding voltage of each terminal station is small before and after switching of the power feeding route, and $\Delta V1$ and $\Delta V3$ of Equation (1) and Equation (2) are also small. As a result, even when switching to the new power feeding route is performed normally, there is a concern that the monitoring device 150 determines that switching of the power feeding route is not performed normally. In such a case, the monitoring device 150 instructs to change a power feeding current from I12 to I13 differing from I12. This instruction may be given to both of the terminal stations 110 and 130. A change of a power feeding current is preferably performed within a range permitted by the undersea cable system 100. After changing the power feeding current, the monitoring device 150 checks whether Equation (3) and Equation (4) are satisfied. In Equation (3) and Equation (4), V11a and V31a are power feeding voltages after the power feeding current is changed to I13, and threshold values Vth11 and Vth31 may differ from the threshold values Vth1 and Vth3 in Equation (1) and Equation (2).

$$\Delta V11 = |V11a - V1b| \geq Vth11 \tag{3}$$

$$\Delta V31 = |V31a - V3b| \geq Vth31 \tag{4}$$

When Equation (3) and Equation (4) are satisfied, it is considered that a power feeding voltage fluctuates according to a power feeding current after switching, and therefore, the monitoring device 150 may determine that switching to a new power feeding route is performed normally.

Figure 10:
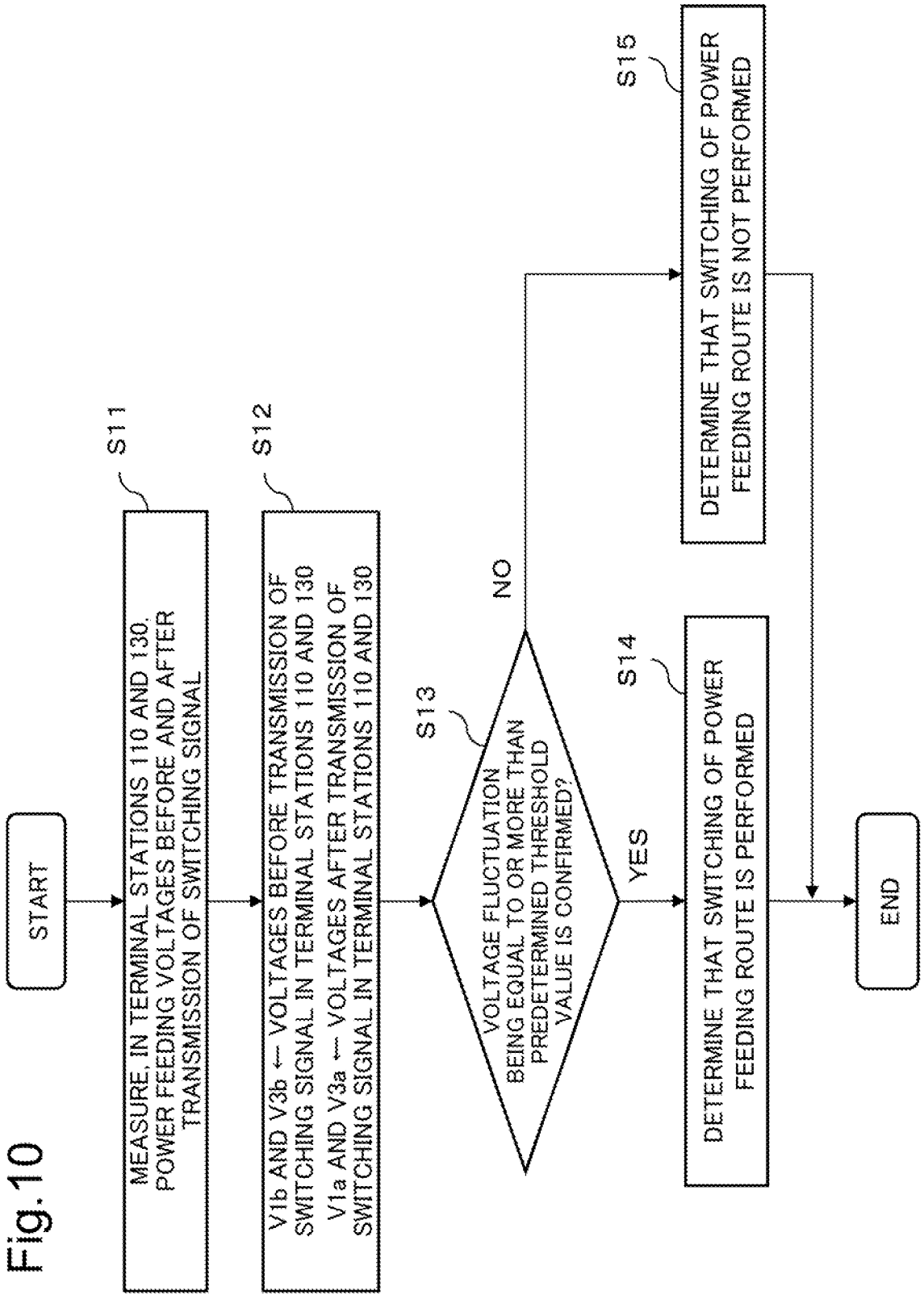
FIG. 10 is a flowchart illustrating an example of a determination procedure of a switching result of a power feeding route.
Figure 11:
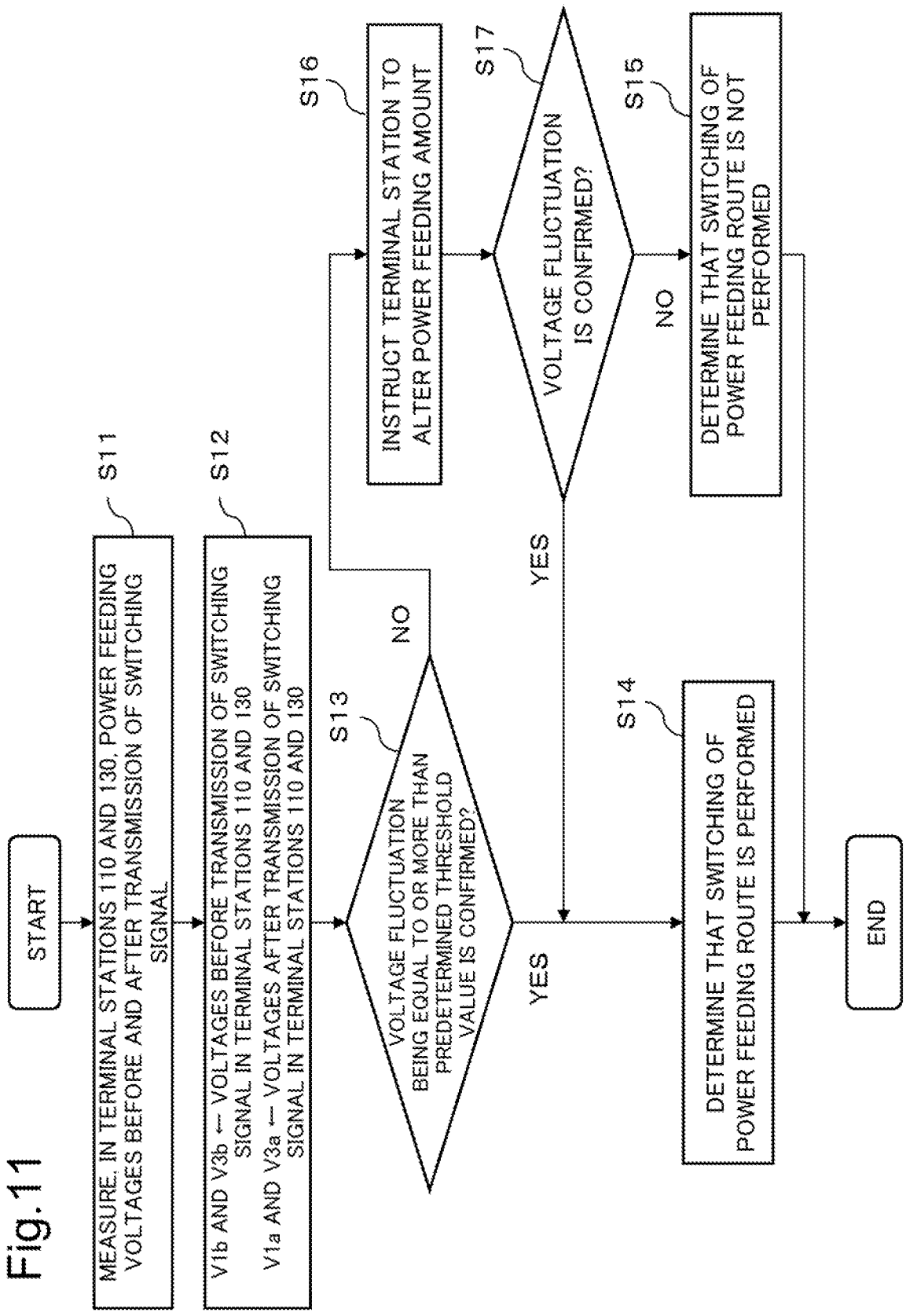
FIG. 11 is a flowchart illustrating an example of the determination procedure of the switching result of the power feeding route.

FIGS. 10 and 11 are flowcharts each illustrating an example of a determination procedure of a switching result of a power feeding route. FIG. 10 illustrates an example of determination using only Equation (1) and Equation (2), and FIG. 11 illustrates an example of determination using Equation (1) to Equation (4).

In a procedure in FIG. 10, first, the terminal station 110 and the terminal station 130 measure power feeding voltages before and after transmission of a switching signal (step S11 in FIG. 10). As described above, the monitoring device 150 notifies the terminal station 110 and the terminal station 130 of transmission timing of the switching signal, and thereby, the terminal station 130 can also measure power feeding voltages before and after the transmission timing of the switching signal by the terminal station 110.

The monitoring device 150 acquires the power feeding voltages from the terminal station 110 and the terminal station 130. It is assumed that the power feeding voltages of the terminal station 110 and the terminal station 130 before transmission of a switching signal to the BU 140 are V1$b$ and V3$b$, respectively. It is assumed that the power feeding voltages of the terminal station 110 and the terminal station 130 after transmission of a switching signal to the BU 140 are V1$a$ and V3$a$, respectively (S12). Further, the monitoring device 150 checks a change in the power feeding voltages of the terminal stations 110 and 130 by use of Equation (1) and Equation (2) (S13). When Equation (1) and Equation (2) are satisfied (S13: YES), the monitoring device 150 determines that switching of a power feeding route is performed normally (S14). When at least one of Equation (1) and Equation (2) is not satisfied (S13: NO), the monitoring device 150 determines that switching of a power feeding route is not performed normally (S15).

A procedure in FIG. 11 differs in including steps S16 and S17 that instruct a terminal station to alter a power feeding amount when a voltage fluctuation being equal to or more than a predetermined threshold value is not confirmed in step S13 in FIG. 10. In other words, when at least one of Equation (1) and Equation (2) is not satisfied (step S13 in FIG. 11: NO), the monitoring device 150 instructs the terminal stations 110 and 130 to alter a power feeding amount (S16). The alteration of the power feeding amount is, for example, an instruction to increase a power feeding current from I12 to I13. The monitoring device 150 checks a change in the power feeding voltages of the terminal stations 110 and 130 by use of Equation (3) and Equation (4) after execution of the instruction (S17). When Equation (3) and Equation (4) are satisfied (S17: YES), the monitoring device 150 determines that switching of a power feeding route is performed normally (S14). When at least one of Equation (3) and Equation (4) is not satisfied (S17: NO), the monitoring device 150 determines that switching of a power feeding route is not performed normally (S15).

As described above, the undersea cable system 100 according to the second example embodiment determines a switching result of a power feeding route in the BU 140, based on a change in a power feeding voltage of each terminal station collected by the monitoring device 150. Thus, even when the BU 140 does not include a function of notifying each terminal station of a switching result of a power feeding route, the monitoring device 150 can determine the switching result of the power feeding route in the BU 140. As a result, necessity for an operator to collect information of each terminal station or operate a power feeding unit when switching a power feeding route is reduced, and advantageous effects such as an improvement in operability, shortening of an operation time, and an improvement in safety can be acquired.

The example embodiments of the present invention are also able to be described as, but are not limited to, the following supplementary notes.

(Supplementary Note 1)

A communication system including:

a plurality of terminal stations each having a function of feeding power to a power feeding path;

a branching unit that performs switching of a power feeding route including the power feeding path; and a monitoring device that compares, in response to any of the plurality of terminal stations transmitting, to the branching unit, a switching signal specifying a power feeding route, a power feeding voltage to the power feeding path being observed by each of the plurality of terminal stations, before and after transmission of the switching signal, and determines, with a fact that the compared power feeding voltage fluctuates by a first threshold value or more, a switching result of the power feeding route in the branching unit.

(Supplementary Note 2)

The communication system according to Supplementary Note 1, wherein the monitoring device compares a voltage of the power feeding path of a terminal station constituting a power feeding route specified by the switching signal among the plurality of terminal stations, before and after transmission of the switching signal.

(Supplementary Note 3)

The communication system according to Supplementary Note 1 or 2, wherein the first threshold value differs for each power feeding path of a terminal station constituting the specified power feeding route.

(Supplementary Note 4)

The communication system according to any one of Supplementary Notes 1 to 3, wherein the monitoring device fluctuates a power feeding amount of the specified power feeding route when any of voltages of the compared power feeding paths do not fluctuate by the first threshold value or more, and determines that the power feeding route is switched, with a fact that a voltage of the power feeding path fluctuates by a second threshold value or more in all terminal stations constituting the specified power feeding route.

(Supplementary Note 5)

The communication system according to Supplementary Note 4, wherein the second threshold value differs for each power feeding path of a terminal station constituting the specified power feeding route.

(Supplementary Note 6)

The communication system according to any one of Supplementary Notes 1 to 5, wherein the monitoring device outputs an alarm when the monitoring device does not determine that the power feeding route is switched.

(Supplementary Note 7)

The communication system according to any one of Supplementary Notes 1 to 6, wherein the monitoring device transmits an alarm signal to at least one of the plurality of terminal stations when the monitoring device does not determine that the power feeding route is switched, and a terminal station having received the alarm signal outputs, to outside, an alarm being associated with the alarm signal.

(Supplementary Note 8)

A monitoring device used in a communication system in which a plurality of terminal stations each having a function of feeding power to a power feeding path are connected to a branching unit that performs switching of a power feeding route including the power feeding path, the monitoring device being connected to the plurality of terminal stations via a communication line, comparing, in response to any of the plurality of terminal stations transmitting, to the branching unit, a switching signal specifying a power feeding route, a power feeding voltage to the power feeding path being observed by each of the plurality of terminal stations, before and after transmission of the switching signal, and determining, with a fact that the compared power feeding voltage fluctuates by a first threshold value or more, a switching result of the power feeding route in the branching unit.

(Supplementary Note 9)

A monitoring method for a communication system in which a plurality of terminal stations each having a function of feeding power to a power feeding path are connected to a branching unit that performs switching of a power feeding route including the power feeding path, the monitoring method including:

comparing, in response to any of the plurality of terminal stations transmitting, to the branching unit, a switching signal specifying a power feeding route, a power feeding voltage to the power feeding path being observed by each of the plurality of terminal stations, before and after transmission of the switching signal; and determining, with a fact that the compared power feeding voltage fluctuates by a first threshold value or more, a switching result of the power feeding route in the branching unit.

(Supplementary Note 10)

The monitoring method according to Supplementary Note 9, further including comparing a voltage of the power feeding path of a terminal station constituting a power feeding route specified by the switching signal among the plurality of terminal stations, before and after transmission of the switching signal.

(Supplementary Note 11)

The monitoring method according to Supplementary Note 9 or 10, wherein the first threshold value differs for each power feeding path of a terminal station constituting the specified power feeding route.

(Supplementary Note 12)

The monitoring method according to any one of Supplementary Notes 9 to 11, further including:

fluctuating a power feeding amount of the specified power feeding route when any of voltages of the compared power feeding paths do not fluctuate by the first threshold value or more; and determining that the power feeding route is switched, with a fact that a voltage of the power feeding path fluctuates by a second threshold value or more in all terminal stations constituting the specified power feeding route.

(Supplementary Note 13)

The monitoring method according to Supplementary Note 12, wherein the second threshold value differs for each power feeding path of a terminal station constituting the specified power feeding route.

(Supplementary Note 14)

The monitoring method according to any one of Supplementary Notes 9 to 13, wherein the monitoring device outputs an alarm when the monitoring device does not determine that the power feeding route is switched.

(Supplementary Note 15)

The monitoring method according to any one of Supplementary Notes 9 to 14, wherein the monitoring device transmits an alarm signal to at least one of the plurality of terminal stations when the monitoring device does not determine that the power feeding route is switched, and a terminal station having received the alarm signal outputs, to outside, an alarm being associated with the alarm signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, although an undersea cable system is described in each example embodiment, the invention of the present application is applicable to a communication system on land as well.

Configurations described in the example embodiments are not necessarily mutually exclusive. An action and an advantageous effect of the present invention may be achieved by a configuration in which all or some of the example embodiments described above are combined.

This application is based upon and claims the benefit of priority from Japanese Patent Application No. 2018-138136, filed on Jul. 24, 2018, the disclosure of which is incorporated herein in its entirety by reference.

REFERENCE SIGNS LIST

100 Undersea cable system
110, 120, 130 Terminal station
111 Command transmission unit
112 Terminal station monitoring unit
113 Power feeding unit
114, 124, 134 Power feeding path
115, 125, 135 Optical transmission path
116, 126, 136 Cable
117, 127, 137 Monitoring line
140 Branching unit (BU)
150 Monitoring device

What is claimed is:

1. A communication system comprising:
a plurality of terminal stations each having a function of feeding power to a power feeding path;
a branching circuit configured to perform switching of a power feeding route including the power feeding path; and
a monitoring device configured to compare, in response to any of the plurality of terminal stations transmitting, to the branching circuit, a switching signal specifying a power feeding route, a power feeding voltage to the power feeding path being observed by each of the plurality of terminal stations at a time before transmission of the switching signal and at a time after transmission of the switching signal, and determine, with a fact that the compared power feeding voltage fluctuates by a first threshold value or more, a switching result of the power feeding route in the branching circuit,
wherein the first threshold value differs for each power feeding path of a terminal station constituting the specified power feeding route.

2. The communication system according to claim 1, wherein
the monitoring device compares the power feeding voltage of a terminal station constituting a power feeding route specified by the switching signal among the plurality of terminal stations at the time before transmission of the switching signal and at the time after transmission of the switching signal.

3. The communication system according to claim 1, wherein the monitoring device
fluctuates a power feeding amount of the specified power feeding route when any of the compared power feeding voltages do not fluctuate by the first threshold value or more, and
determines that the power feeding route is switched, with a fact that the power feeding voltage fluctuates by a second threshold value or more in all terminal stations constituting the specified power feeding route.

4. The communication system according to claim 3, wherein
the second threshold value differs for each power feeding path of a terminal station constituting the specified power feeding route.

5. The communication system according to claim 1, wherein
the monitoring device outputs an alarm when the monitoring device does not determine that the power feeding route is switched.

6. The communication system according to claim 1, wherein
the monitoring device transmits an alarm signal to at least one of the plurality of terminal stations when the monitoring device does not determine that the power feeding route is switched, and a terminal station having received the alarm signal outputs, to outside, an alarm being associated with the alarm signal.

7. The communication system according to claim 2, wherein
the first threshold value differs for each power feeding path of a terminal station constituting the specified power feeding route.

8. The communication system according to claim 2, wherein the monitoring device
fluctuates a power feeding amount of the specified power feeding route when any of the compared power feeding voltages do not fluctuate by the first threshold value or more, and
determines that the power feeding route is switched, with a fact that the power feeding voltage fluctuates by a second threshold value or more in all terminal stations constituting the specified power feeding route.

9. The communication system according to claim 2, wherein
the monitoring device outputs an alarm when the monitoring device does not determine that the power feeding route is switched.

10. The communication system according to claim 2, wherein
the monitoring device transmits an alarm signal to at least one of the plurality of terminal stations when the monitoring device does not determine that the power feeding route is switched, and a terminal station having received the alarm signal outputs, to outside, an alarm being associated with the alarm signal.

11. A monitoring device used in a communication system in which a plurality of terminal stations each having a function of feeding power to a power feeding path are connected to a branching circuit configured to perform switching of a power feeding route including the power feeding path, the monitoring device comprising:
an interface being connected to the plurality of terminal stations via a communication line; and
a calculator configured to compare, in response to any of the plurality of terminal stations transmitting, to the branching circuit, a switching signal specifying a power feeding route, a power feeding voltage to the power feeding path being observed by each of the plurality of terminal stations at a time before transmission of the switching signal and at a time after transmission of the switching signal, and determine, with a fact that the compared power feeding voltage fluctuates by a first threshold value or more, a switching result of the power feeding route in the branching circuit,
wherein the first threshold value differs for each power feeding path of a terminal station constituting the specified power feeding route.

12. A monitoring method for a communication system in which a plurality of terminal stations each having a function of feeding power to a power feeding path are connected to a branching circuit configured to perform switching of a power feeding route including the power feeding path, the monitoring method comprising:
comparing, in response to any of the plurality of terminal stations transmitting, to the branching circuit, a switching signal specifying a power feeding route, a power feeding voltage to the power feeding path being observed by each of the plurality of terminal stations at a time before transmission of the switching signal and at a time after transmission of the switching signal; and
determining, with a fact that the compared power feeding voltage fluctuates by a first threshold value or more, a switching result of the power feeding route in the branching circuit,
wherein the first threshold value differs for each power feeding path of a terminal station constituting the specified power feeding route.

13. The monitoring method according to claim 12, further comprising comparing the power feeding voltage of a terminal station constituting a power feeding route specified by the switching signal among the plurality of terminal stations at the time before transmission of the switching signal and at the time after transmission of the switching signal.

14. The monitoring method according claim 12, further comprising:
fluctuating a power feeding amount of the specified power feeding route when any of the compared power feeding voltages do not fluctuate by the first threshold value or more; and
determining that the power feeding route is switched, with a fact that the power feeding voltage fluctuates by a second threshold value or more in all terminal stations constituting the specified power feeding route.

15. The monitoring method according to claim 14, wherein
the second threshold value differs for each power feeding path of a terminal station constituting the specified power feeding route.

16. The monitoring method according to claim 12, wherein
the monitoring device outputs an alarm when the monitoring device does not determine that the power feeding route is switched.

17. The monitoring method according to claim 12, wherein the monitoring device transmits an alarm signal to at least one of the plurality of terminal stations when the monitoring device does not determine that the power feeding route is switched, and a terminal station having received the alarm signal outputs, to outside, an alarm being associated with the alarm signal.

\* \* \* \* \*